April 24, 1945.    C. A. BRAIDWOOD    2,374,408
INDICATING SYSTEM
Filed June 22, 1943    2 Sheets-Sheet 1
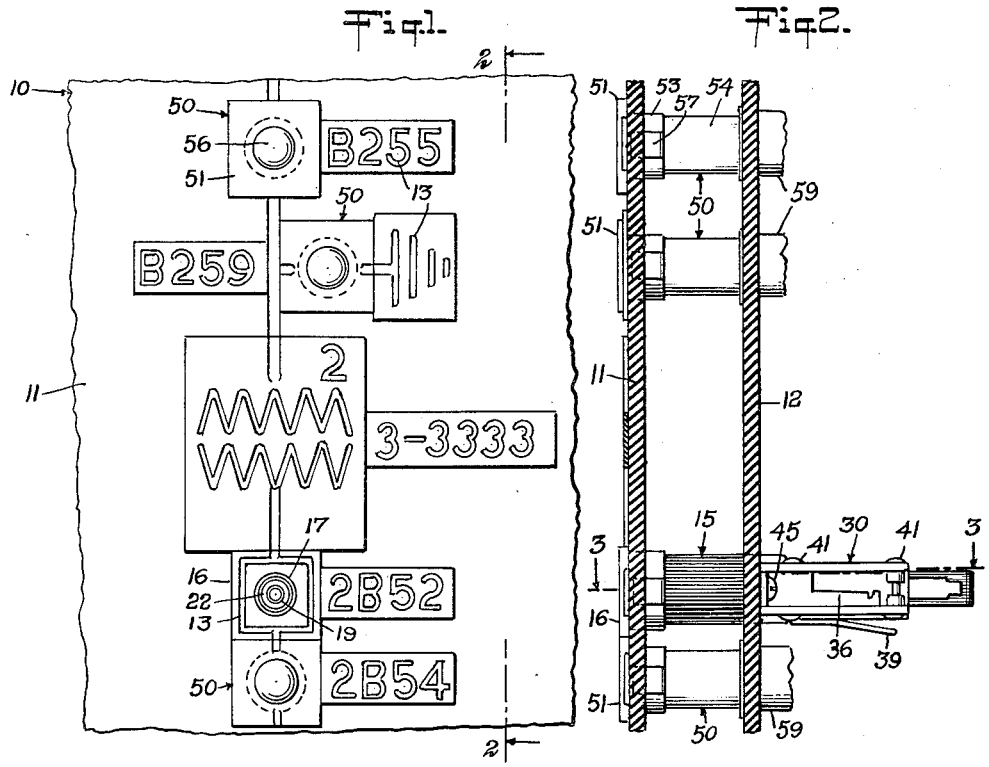
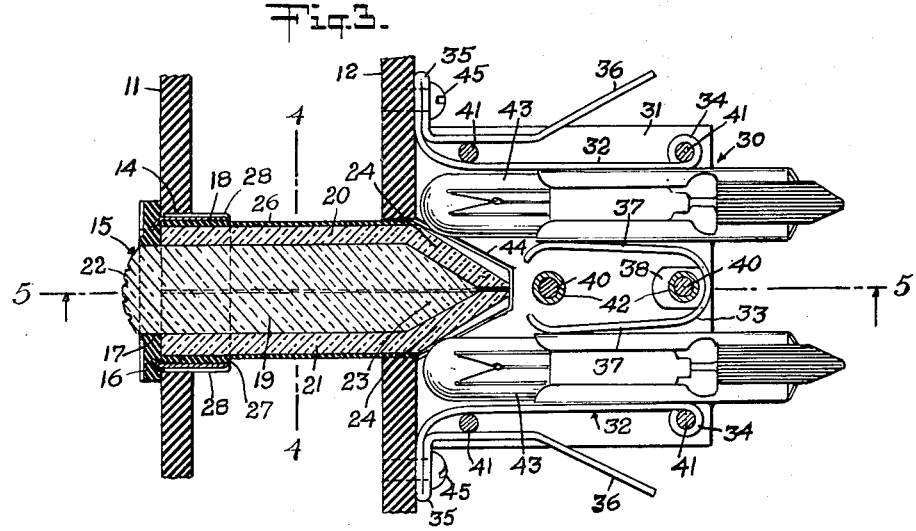
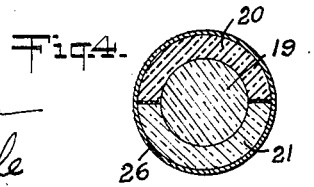
INVENTOR.
Chester A. Braidwood April 24, 1945.  C. A. BRAIDWOOD  2,374,408
INDICATING SYSTEM
Filed June 22, 1943   2 Sheets-Sheet 2
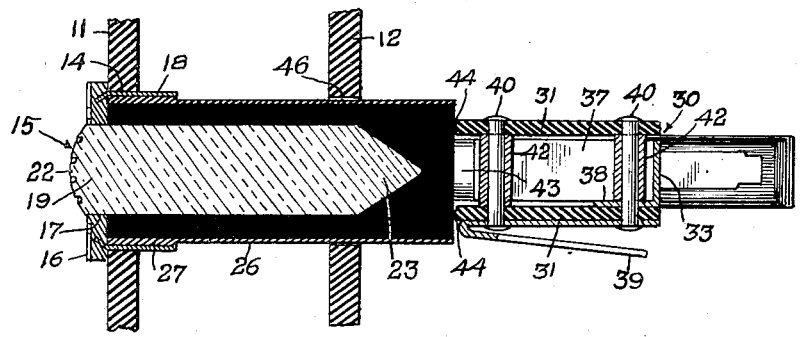
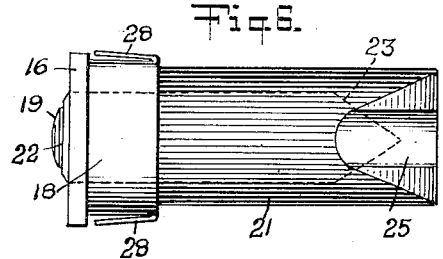 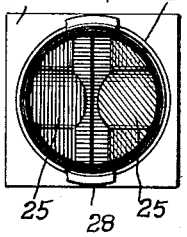 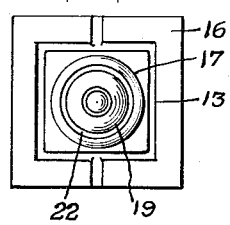
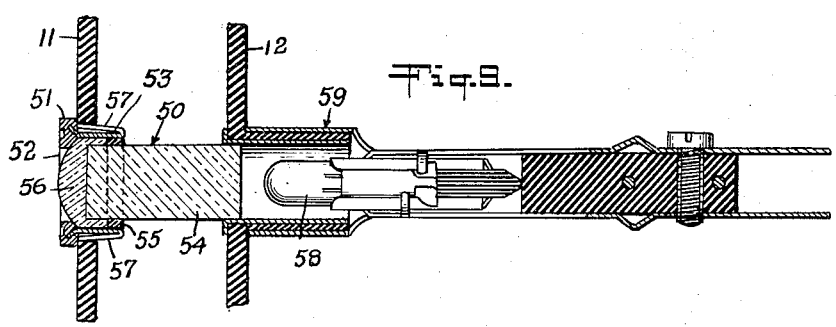
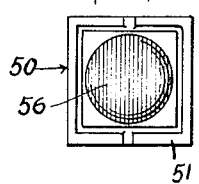 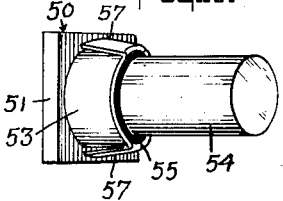
INVENTOR.
Chester A. Braidwood
BY
Munn, Liddy & Glaccum
Attorneys Patented Apr. 24, 1945

2,374,408

UNITED STATES PATENT OFFICE 2,374,408

INDICATING SYSTEM

Chester A. Braidwood, Perth Amboy, N. J.; Emily Nelson Braidwood, Perth Amboy, N. J., executrix of said Chester A. Braidwood, deceased Application June 22, 1943, Serial No. 491,788

8 Claims. (Cl. 177—329)

This invention relates to a system to indicate the condition and position of things and may be used advantageously to indicate the position of various electrical or mechanical controls and other devices and for other similar and analogous purposes.

An object of the invention is the provision of a system of the character mentioned by which the condition or position of things may be indicated visually in conjunction with a panel or board having appropriate indices, and such visual indications being in the nature of clear and/or colored spots of cold light derived from electric lamps, to the end that said indices if made of plastic material and the like will not become mutilated or rendered useless.

A further object of the invention is the provision of a system as characterized above in which radiolucent indicator units are employed in combination with electric light sources in order to dissipate heat away from most vital parts so as to enhance the value and effect of sign boards and the like used as tell tales or indicators.

A further object is the provision of indicators which are well adapted to be used in close proximity to each other to conserve space.

A further object is the provision of radiolucent indicators which are detachable and interchangeable and also single indicators which are multi-colored to produce distinctively colored spots of light to denote position or condition of things economically and conveniently.

Other objects of the invention will appear from the embodiments thereof described in the following specification and illustrated by way of example in the accompanying drawings, in which—

Fig. 1 is a fragmentary face view of a panel board selected to illustrate the features of the invention shown applied thereto.

Fig. 2 is a sectional view taken on the line 2—2 of Fig. 1.

Fig. 3 is an enlarged sectional view taken on the line 3—3 of Fig. 2 showing a multiple indicator unit.

Fig. 4 is an enlarged sectional view taken on the line 4—4 of Fig. 3.

Fig. 5 is an enlarged sectional view taken on the line 5—5 of Fig. 3.

Fig. 6 is a side view of a multiple indicator unit.

Fig. 7 is an inner end view of the unit shown in Fig. 6.

Fig. 8 is an outer end view of the unit shown in Fig. 6.

Fig. 9 is a sectional view showing a modification.

Fig. 10 is an outer end view of the indicator unit shown in Fig. 9.

Fig. 11 is a perspective view of the indicator unit shown in Fig. 9.

As stated, the invention may be applied advantageously to a board having appropriate indices and markings to indicate the condition and position of things and instrumentalities. In the present instance, by way of example, there is shown a portion of such a board 10 which consists of a front panel 11 and a back panel 12 in spaced relation to each other. On its front face the panel 11 has certain markings which are generally designated by the numeral 13. The markings represent the wiring diagram, certain electrical circuits and devices, such as switches, for controlling the circuits and constituting equipment installed in electric power stations and the like. The markings are formed by grooves in the face of the panel 11 and these grooves are filled with paint or plastic material to make the diagram visually effective. At the proper intervals the panel 10 has holes 14 therein which receive the indicator units of the present invention as counterparts of the diagram.

In Fig. 3 there is shown an indicator unit 15 of the multiple type which is designed and adapted to give two different indications or signals in distinctive colors. It is to be understood a required number of units of this type may be used. Each unit 15 consists of a frame member 16 in the nature of a bezel and providing an aperture 17 of any shape, it being round in the present instance. A tubular member 18 in the nature of a ferrule is secured in any suitable manner to the frame member 16 at the back thereof in registry with the aperture 17. The member 18 is larger in diameter than the aperture. A radiolucent element is held in place by the ferrule 18 and said element consists of parts 19, 20 and 21 respectively. The part 19 is of cross-sectionally round rod formation and the parts 20 and 21 put together surround the part 19, each part 20 and 21 being semi-annular in cross-section. The part 19 is made of methyl methacrylate, a material which is radiolucent in that it has the property of transmitting or conducting light without diffusion. The part 19 is of clear substance. The parts 20 and 21 are made of radiolucent colored material such as a phenol formaldehyde product. The outer end of the part 19 is ribbed to give a lens or bull's eye effect, as at 22, and the inner end is conical as at 23. The inner ends of the parts 20 and 21 are semi-conical, as at 24, so that together they conform closely to the conical end 23. The inner end of each of the parts 20 and 21 on the outside is beveled with a concavity or recess 25 therein. The cylindrical surfaces and meeting faces of the parts 20 and 21 are coated with an opaque substance 26, such as paint or lacquer, to insulate them from each other and from extraneous light rays. The parts 20 and 21 are disposed symmetrically about the part 19 with the parts 20 and 21 projecting in part into the ferrule 18 in contact therewith and cemented or otherwise secured thereto by plastic 27. The outer end of the part 19 projects into and slightly through the aperture 17 in the frame member 16. Spring clips 28 are secured to the ferrule 18 on opposite sides thereof and serve as a means to detachably support the unit 15 in a hole 14 by engaging the wall of the latter. Thus, the unit 15 is in fact a plug which may be readily removed and its position changed on the panel 11. The frame member 16 limits the insertion of the unit 15 by contacting the face of the panel 11. This member 16 may also be marked or bear indicia appropriate to its particular use.

Each unit 15 cooperates with a multiple light emitting unit 30 carried by the back panel 12. Each unit 30 includes a socket consisting of plates 31 of insulating material such as fibre, Bakelite and the like, spacers 32, and resilient multiple contact 33 which divides the socket into two lamp compartments. Each spacer 32 is made from a single piece of conducting material to provide a screw eye 34, apertured attaching lug 35 and terminal 36. The contact 33 is made of a single piece of sheet conducting material cut, bent and formed to produce a general V shape structure presenting resilient contact members 37 and ear 38 at the bight. The outer ends of the members 37 are curved. A return terminal 39 is held in place on one of the plates 31 by rivets 40, one of which engages the ear 38, whereas the other one engages a spacing sleeve 42 near the outer ends of the members 37. Rivets 41 pass through the eyes 34 and plates 31 to hold these parts associated. The members 37 cooperate with the spacers 32 respectively to retain two electric lamps 43 in the compartments of the socket in electrical connection therewith. Each lamp is of the plug-in type with side contacts to bear on the related spacer 32 and member 37 when inserted. It will be apparent the members 37 exert pressure to maintain effective electrical connection. Upon insertion of one lamp, pressure of the latter on one of the members 37 oscillates the contact 33 somewhat, allowing said lamp to be inserted rather easily. When the second lamp is inserted, the pressure on the other member 37 increases the tension and pressure of both members 37 on the lamps and the latter against the spacers 32. The terminals 36 serve for connection with the feed wires to the lamps and the terminal 39 serves for connection with the return wire to the source of electrical energy. The lamps 43 are the sources of light for the unit 15. The plates 31 have V notches 44, respectively, to receive the conical end of the unit 15 in such manner to prevent the leakage of light. The bulbs of the lamps 43 are received in the recesses 25, respectively, to make a close association with the parts 20 and 21. Screws 45 received by the lugs 35 serve to secure the socket to the back panel 12 which has an aperture 46 to receive the unit 15 in the manner described.

From the foregoing, it will be apparent light emanating from one lamp is transmitted by the part 20 and part 19 to produce a red spot of cold light at the face of the panel 11, whereas light from the other lamp is transmitted by the part 21 and part 19 to produce a green spot of cold light at the face of the panel 11. These distinctive spots of light in conjunction with the markings on the panel 11 and frame member 16 indicate definite conditions or positions of things such as the opening and closing of switches.

It will be appreciated that any suitable number of the units 15 and 30 may be used; that by having the lamps on a back panel spaced from an indicia panel, heat will be kept from the latter due to the air space between the panels, and because of the free play of cold air which will dissipate the heat of the lamps and thus preserve the markings on the indicia panel; and that the radiolucent units 15 extend the light rays in such manner that cold light indications occur at the front panel to the elimination of heat.

The provision of the detachable units 15 makes it easy to alter the information presented, and economical to maintain a board with a large number of indicators.

The indicator units may be diversely composed as will appear from Figs. 9–11. In these figures are shown a radiolucent unit 50 comprising a frame member or bezel 51 having an aperture 52. A tubular member 53 is secured to the member 51 at the back thereof in registry with the aperture 52, the member 53 being somewhat larger in diameter than said aperture. A radiolucent rod 54 has one end portion projecting into the member 53 and suitable bonding material 55, plastic or any other material secures the rod 54 to said material 55 also holds a glow cap 56 between the outer end of the rod 54 and the bezel 51 with the cap 56 disposed in the aperture 52. This cap may be glass or other analogous substance, and is of any selected color to glow brilliantly from the light conducted to it by the rod 54. The tubular member has spring clips 57 which function to frictionally retain the unit in an aperture in the front panel 11. The unit 50 like the unit 15 is of a plug-in type and is therefore removable. The frame member 51 limits the insertion of the unit by contacting the front face of the panel 11. Light for the unit 50 is derived from a lamp 58 in a socket 59 secured to the panel 12. The radiolucent rod 54 is of a length to enable the inner end to project into the socket 59 to prevent leakage of light. In cases where indicators are arranged in close proximity to each other the radiolucent rods may be coated with opaque substance as mentioned hereinabove, such substance being designated 26. This will keep each radiolucent rod from being affected from extraneous light adjacent rods while the latter transmit light.

I claim:

1. An indicator comprising distinctively colored elongated radiolucent members, a bezel, a clear radiolucent rod in light conducting relation to said members and having its outer end exposed in said bezel, and a covering of opaque material on the outer surfaces of said colored members but leaving the inner ends of the members bare.

2. An indicating device comprising a rod of clear radiolucent material, one end of said rod serving as a spot light when light rays are transmitted to the rod, means for transmitting light of one color to said rod, a second means for transmitting light of another color to said rod, and means to light insulate the first and second means from each other and from extraneous light.

3. An indicating device comprising a rod of clear radiolucent material, one end of said rod serving as a spot light when light rays are transmitted to the rod, and a plurality of distinctively colored radiolucent pieces of material surrounding said rod each of which transmits to said rod a distinctively colored light.

4. An indicating system including a front indicia panel, a back panel spaced from the front panel, radiolucent indicators on the front panel, and light sources on the back panel in light emitting relation to said indicators respectively, each of said indicators including a clear radiolucent rod whose front end is at or near the face of said front panel, and distinctively colored radiolucent means in light transmitting relation to each of said light sources and said rod.

5. An indicating system including a front indicia panel, a back panel spaced from the front panel, radiolucent indicators on the front panel, and light sources on the back panel in light emitting relation to said indicators respectively, each of said indicators comprising radiolucent members and each member of a distinctive color, and a clear radiolucent rod common to said members in light transmitting relation thereto, one end of said rod serving as a spot light when rays of light are transmitted thereto from either of said members.

6. An indicating system including a front indicia panel, a back panel spaced from the front panel, radiolucent indicators on the front panel, and light sources on the back panel in light emitting relation to said indicators respectively, each of said indicators including radiolucent members each of which is of a distinctive color, a clear radiolucent rod in light transmitting relation to said members and opaque means to light insulate said members from each other except at the inner ends.

7. An indicating system including a front indicia panel, a back panel spaced from the front panel, radiolucent indicators on the front panel, and light sources on the back panel in light emitting relation to said indicators respectively, each of said indicators including radiolucent members arranged side by side and each member of a distinctive color, and a clear radiolucent rod in light transmitting relation to said members, the inner end of each member being recessed to contact its light source in such way as to prevent leakage of light.

8. An indicating device comprising a rod of clear radiolucent material, the outer end of said rod serving as a spot light when light rays are transmitted to the rod, the inner end of the rod being conical, and a plurality of pieces each of which is of a radiolucent distinctively colored material enclosing all of the rod except its outer end, and each of said pieces serving to transmit to said rod a distinctively colored light.

CHESTER A. BRAIDWOOD.